Figure 1:
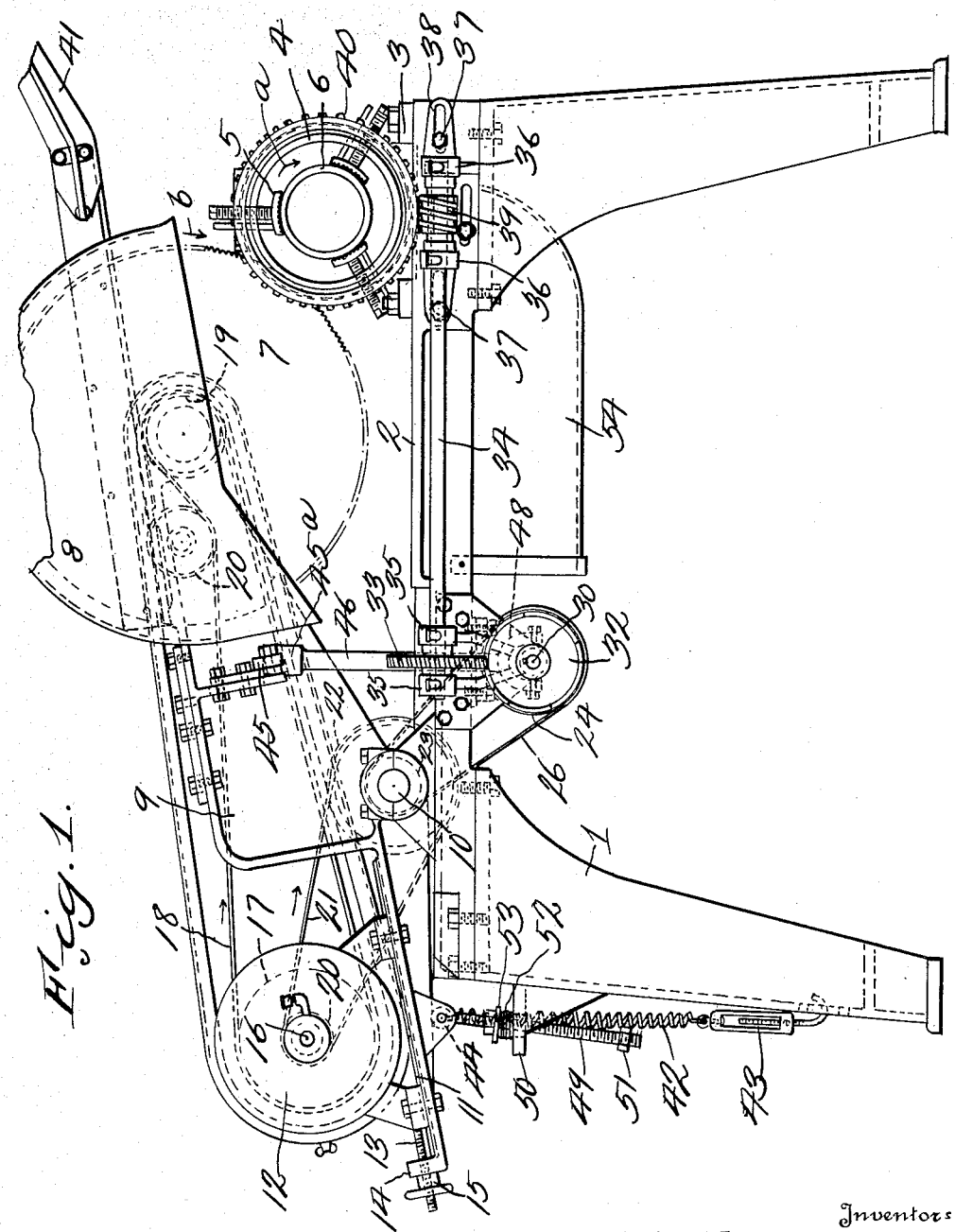

Feb. 4, 1930.  O. F. KLEEB ET AL  1,745,699
TUBE CUTTING AND ROTATING MACHINE
Filed Aug. 27, 1927   3 Sheets-Sheet 2

Inventors
Otto F. Kleeb and
Henry F. Fullerton
By Philip A. H. Sewell
Attorney

Feb. 4, 1930.  O. F. KLEEB ET AL  1,745,699
TUBE CUTTING AND ROTATING MACHINE
Filed Aug. 27, 1927  3 Sheets-Sheet 3

Inventors
Otto F. Kleeb and
Henry J. Fullerton
By Philip A. H. Sewell
Attorney

Patented Feb. 4, 1930

1,745,699

UNITED STATES PATENT OFFICE

OTTO FRED KLEEB AND HENRY JAMES FULLERTON, OF PITTSBURGH, PENNSYLVANIA, ASSIGNORS TO HUNTER SAW AND MACHINE COMPANY, OF PITTSBURGH, PENNSYLVANIA

TUBE CUTTING AND ROTATING MACHINE

Application filed August 27, 1927. Serial No. 215,843.

The invention relates to tube cutting machines, and has for its object to provide a device of this character having a pivoted frame provided with a rotatable saw, and a rotatable chuck for the reception of a tube to be severed, and means whereby upon pivotal movement of the saw frame towards cutting position, the rotatable chuck will be automatically rotated for rotating a tube after the saw cuts into the side thereof for a limited depth, and the rotation of the chuck with the sawing operation reduces the formation of burrs on the severed tube to a minimum.

A further object is to provide a single source of power for the saw and the rotatable chuck. Also to utilize said source of power as a partial counterbalance for the pivoted frame.

A further object is to provide spring means connected to the pivoted saw frame for partially counter-balancing the same and having a tendency to raise the saw. Also to provide spring means carried by the saw frame and cooperating with the fixed frame for absorbing the shock incident to the return of the pivoted saw frame to raised inoperative position.

A further object is to provide the bed plate with an adjustably mounted chuck having a gear for rotating the same, and driving connections between the motor of the pivoted saw frame and said chuck, whereby upon a downward movement of the pivoted saw frame to operative position, said chuck will be rotated. Also means for varying the period of operation of the chuck in relation to the pivotal movement of the saw carrying frame, thereby allowing the saw to make a cut in the tube before the tube starts to rotate.

A further object is to provide the under side of the bed plate with a transversely disposed shaft constantly driven by the motor, and which shaft has a driving connection with the rotatable chuck and a clutch, said clutch being controlled by an upwardly extending pivoted arm, the upper end of which arm is in the path of a roller carried by the pivoted saw frame, whereby upon a downward movement to operative position of the saw frame, said clutch frame will be clutched, thereby imparting rotation to the rotatable clutch and its driving connection.

A further object is to provide a driving connection between the transversely disposed constantly driven shaft and the chuck comprising a worm carried by a shaft at one side of the frame and rotating the chuck drum and cooperating gear connections between the shaft and the constantly driven shaft, and clutch means for controlling the operation, at predetermined periods, of said mechanism.

A further object is to adjustably mount the drive motor on the pivoted saw frame and to drive all of the rotatable parts of the machine from said motor.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

Figure 2:
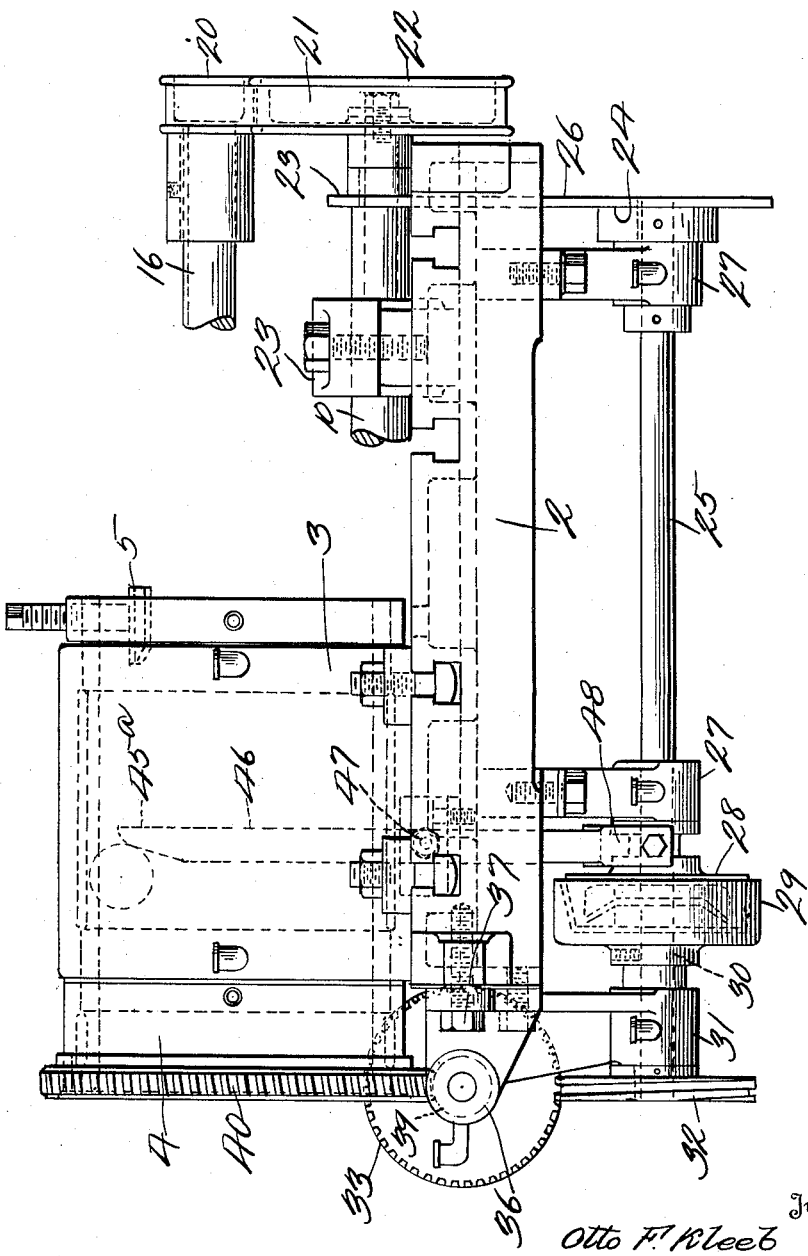
Figure 3:
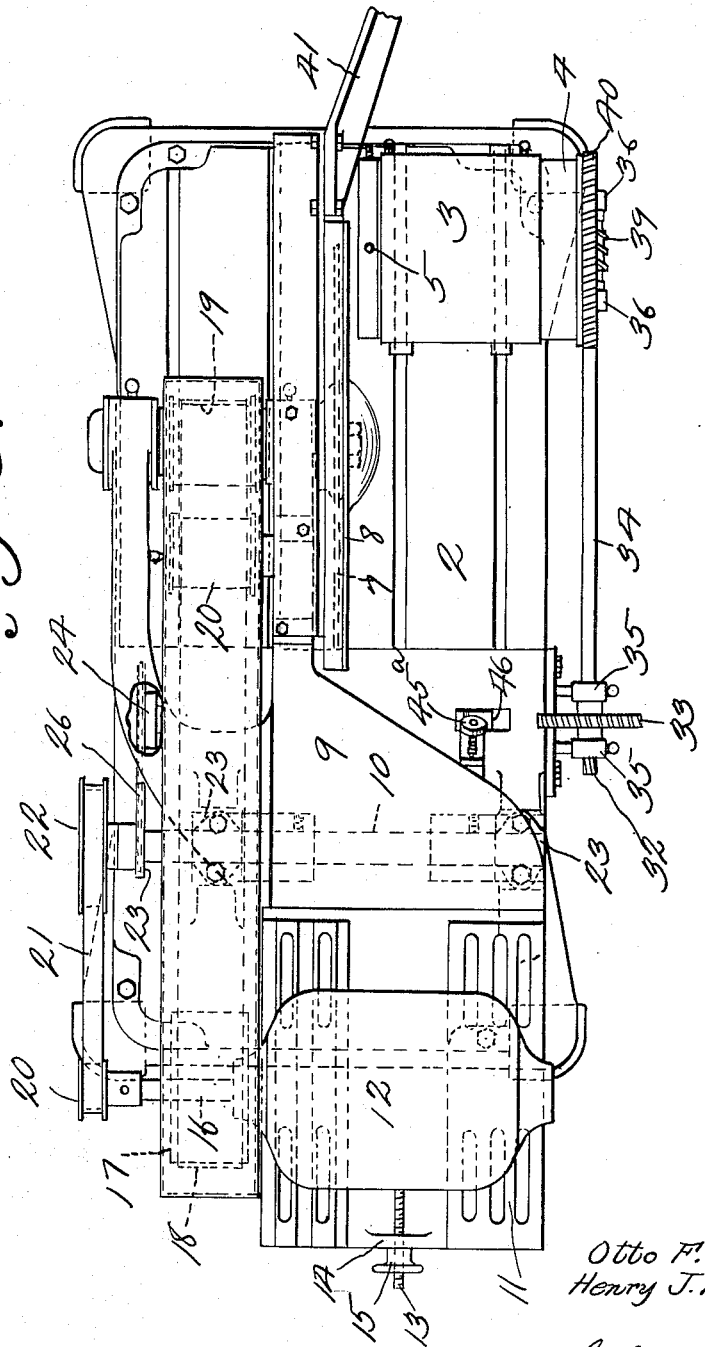

In the drawings:
Figure 1 is a side elevation of the machine.
Figure 2 is a front elevation of the machine, parts being eliminated to better show the structure.
Figure 3 is a top plan view of the machine.
Referring to the drawings, the numeral 1 designates the frame of the machine and 2 the bed plate on which is adjustably mounted a frame 3 having rotatably mounted therein a chuckbarrel 4, which chuck barrel is provided with clamping jaws 5, and by means of which a tube 6 may be easily and quickly clamped in the rotatable barrel 4 for rotating the tube during the sawing operation, and at which time the tube rotates in the direction of the arrow $a$, and the saw 7 rotates in the direction of the arrow b, Figure 1. The saw 7 is disposed in a saw guard 8 and is carried by the forward end of the pivoted saw carrying frame 9, which is pivotally mounted on the shaft 10 carried by the upper side of the frame 1. Adjustably mounted on the guide 11 of the frame 9 and rearwardly of the shaft 10 forming its pivotal point is a motor 12, which motor is provided with a rearwardly extending adjusting screw 13, which extends through the flange 14 carried by the rear end of the pivoted frame, and provided with an adjusting member 15, which when tightened will adjust the motor 12 rearwardly for tightening the various belts hereinafter set forth, and for counterbalancing the frame 9 to a certain extent.

The motor shaft 16 is provided with a pulley 17 over which the saw drive belt 18 extends, and which saw drive belt extends over the saw pulley 19, and preferably under an idler 20, therefore it will be seen that upon operation of the motor 12, the saw will be rotated in the direction of the arrow b, Figure 1. The shaft 16 is also provided with a pulley 20 over which an endless belt 21 extends, and which endless belt extends over the pulley 22 carried by the shaft 10, therefore it will be seen that during the operation of the shaft 16, and the motor 12, the pulleys 20 and 22 will be rotated thereby imparting rotation to the pulley 23 carried by the shaft 10, and the pulley 24 carried by a constantly driven shaft 25 beneath the bed plate 2 of the machine; said pulleys 23 and 24 being belted together by means of the belt 26. During the operation of the machine the saw 7 and the shaft 25 constantly operate during the operation of the motor 12, however the chuck barrel 4 only rotates during the actual cutting of the tube.

The constantly rotated shaft 25 is rotatably mounted in bearing members 27 extending downwardly from the under side of the bed plate 2, and has slidably mounted thereon a male clutch member 28, which male clutch member cooperates with a female clutch element 29 carried by the shaft 30, and supported in the bearing 31, therefore it will be seen that when the clutch elements 28 and 29 are in clutched relation, the shaft 30 will be rotated, thereby rotating the spiral gear 32, which spiral gear meshes with the gear 33 to one side of the bed plate 2, and which gear 33 is carried by the forwardly extending shaft 34. Shaft 34 is rotatably mounted in bearing members 35 and 36, which are adjustably mounted on the side of the bed plate by means of bolts 37, which extend through elongated apertures 38, thereby allowing an accurate adjustment. Mounted on the shaft 34 is a worm 39, which meshes with a worm gear 40 carried by the chuck barrel 4, consequently rotation is imparted to the chuck barrel from the constantly rotated shaft 25, that is when the clutch elements 28 and 29 are in engagement with each other.

When it is desired to cut a tube, the tube is placed in the chuck barrel 4, then the operator grasps the handle member 41 and pulls downwardly thereon, which action will stretch the spring 42, which is anchored to the frame 1 by means of the turn buckle 43, and to the saw frame 9 at 44. Spring 42 is sufficiently strong to return the saw carrying frame 9 to its inoperative position as shown in Figure 1. As the saw continues downwardly, the roller 45, which is adjustably mounted on the frame 9 engages the upper end 45ª of the lever 46, which lever is pivotally mounted at 47 and extends downwardly through the bed plate 1, and is provided with a conventional form of clutch fork 48, which controls the axial movement of the clutch element 28, therefore it will be seen that when the roller moves downwardly it will tilt the lever 46, clutch the elements 28 and 29, and will allow power to be transmitted to the chuck barrel 4 from the constantly rotated shaft 25. The operator forces the saw downwardly for making the initial cut in the tube 6, and after which, as the tube is rotating, the saw will complete the circumferential severing of the tube. It has been found that by rotating the tube simultaneously with the sawing operation the saw does not form burrs, and a clean, clear cut is made. The downward movement of the saw is limited by means of the bolt 49, which extends through an apertured bracket 50 carried by the frame 1, and is provided with a nut 51 which is adjusted in relation to the bracket 50, whereby the downward movement of the saw is limited in its movement for instance to a position where it will sever one side of the tube 6, thereby allowing the tube to be fed by its rotation to the saw for completing the circumferential severing of the tube. Surrounding the threaded bolt 49 above the bracket 50 is a coiled spring 52, and which coiled spring is below a nut held washer 53, and forms means whereby upon upward movement of the saw, and tilting of the frame 9, under the influence of the coiled spring 42, the shock will be absorbed.

The chips from the work are discharged downwardly into the hopper 54.

From the above it will be seen that an automatic tube cutting machine is provided wherein a motor is mounted on a tiltable frame, drives the saw carried by the tiltable frame, and power is transmitted from said motor to a rotatable chuck barrel on a stationary frame, and the tiltable frame cooperates with means for starting and stopping the rotation of the chuck barrel. It will also be seen that the motor partially counterbalances the tiltable frame, and spring means is provided for normally raising the saw carrying end of the tiltable frame, and a shock receiving spring is provided for absorbing the shock as the tiltable frame approaches its raised position.

The invention having been set forth what is claimed as new and useful is:—

1. The combination with a metal sawing machine comprising a base, a tiltable frame mounted on said base, a motor mounted on said frame, a saw carried by the frame, a driving connection between the motor and saw, a rotatable chuck carried by the base, of means whereby upon pivotal movement of the frame said motor transmits power to the rotatable chuck.

2. The combination with a metal sawing machine comprising a base, a downwardly tiltable saw carrying frame mounted on said base, a saw carried by said frame, a motor mounted on the frame and driving the saw, a rotatable chuck carried by the base adjacent the saw, of driving connections between the motor and the rotatable chuck and means whereby said driving connections are made operative upon downward movement of the tiltable frame.

3. The combination with a metal sawing machine comprising a base, a tiltable saw carrying frame mounted on said base, a saw carried by said frame, a motor mounted on the frame, driving connections between the motor and the saw, a rotatable chuck mounted on the base, driving connections between the motor and the chuck, said driving connections being made operative by the pivotal movement of the frame.

4. The combination with a metal sawing machine comprising a base, a tiltable saw frame mounted on said base, a saw carried by said frame, a motor mounted on the frame and driving the saw, a constantly rotated shaft carried by the base, driving connections between the motor and the constantly rotated shaft, of a rotatable chuck, clutch controlled driving connections between the constantly rotated shaft and the rotatable chuck, said clutch connections being made operative by the tiltable frame.

5. The combination with a metal sawing machine comprising a base, a tiltable saw frame mounted on said base, a saw carried by said frame, a motor mounted on the frame and driving the saw, a constantly rotated shaft carried by the base, driving connections between the motor and the constantly rotated shaft, of a rotatable chuck mounted on the base, clutch controlled driving means for the rotatable chuck and carried by the constantly rotated shaft, an upwardly extending pivoted clutch controlled lever carried by the base and means carried by the pivoted frame and cooperating with the lever, whereby upon downward movement of the frame said clutch will be moved to clutch position.

6. The combination with a metal sawing machine comprising a base, a tiltable saw carrying frame mounted on said base, a rotatable saw carried by the frame, of a rotatable chuck on the base adjacent the saw, a motor mounted on the tiltable frame, driving connections between the motor and the rotatable chuck, said driving connections being made operative by the pivotal movement of the tiltable frame.

7. The combination with a metal sawing machine comprising a base having a tiltable frame mounted thereon and provided with a saw driven by a motor on said tiltable frame, a rotatable chuck, of means for driving said chuck from said motor, said means comprising a constantly rotated shaft beneath the base and driven by the motor, a shaft rotatably mounted on the base, a shaft having a clutch connection with the constantly rotated shaft, gear connections between said last named shaft and the shaft carried by the base, gear connections between the shaft carried by the base and the rotatable chuck and means cooperating with the clutch connection and controlled by the tiltable frame whereby upon downward movement of the tiltable frame said clutch connection will be forced to clutched position.

8. The combination with a metal sawing machine comprising a base, a tiltable saw carrying frame mounted on the base, a cutting saw mounted on the frame, a motor mounted on said saw carrying frame and operating the saw, a rotatable chuck carried by the base, of means for rotating said chuck, said means comprising a shaft carried by the base, driving connections between said shaft and the rotatable chuck, a constantly rotated shaft carried by the base and rotated by the motor, gear connections between the constantly rotated shaft and the shaft carried by the base, a clutch interposed between said last named gear connections and the constantly rotated shaft, a clutch lever pivotally mounted on the base, a member carried by the tiltable frame and cooperating with the lever whereby upon downward movement of the tiltable frame said clutch will be forced to clutched position for driving the rotatable chuck and means for limiting the downward movement of the tiltable frame.

9. The combination with a metal sawing machine comprising a base, a tiltable saw carrying frame mounted on the base, a saw carried by one end of the frame, a saw driving motor carried by the other end of the frame, said frame being pivoted at a point spaced from its ends, a spring anchored to said saw carrying frame to one side of its pivotal point and adjacent the motor and to the base and forming means for normally maintaining the saw carrying end of the frame in raised position, said motor being longitudinally adjustable on the frame and in combination with the spring forming means for counterbalancing the tiltable frame, a bolt pivotally connected to the saw carrying frame rearwardly of its pivotal point adjacent the motor, said bolt extending through a bracket carried by the base, a shock absorbing spring carried by said bolt above the bracket and an adjustable limiting member carried by said bolt beneath the bracket and cooperating with the bracket.

In testimony whereof we hereunto affix our signatures.

OTTO FRED KLEEB.
HENRY JAMES FULLERTON.